United States Patent [19]
Peiffer et al.

[11] Patent Number: 5,766,532
[45] Date of Patent: Jun. 16, 1998

[54] PROCESS FOR THE PRODUCTION OF A BIAXIALLY HIGHLY ORIENTED POLYPROPYLENE FILM

[75] Inventors: Herbert Peiffer, Mainz; Ursula Murschall, Nierstein; Detlef Busch, Saarlouis; Harald Lohmann, Neunkirchen, all of Germany

[73] Assignee: Hoechst AG, Germany

[21] Appl. No.: 439,598

[22] Filed: May 12, 1995

[30] Foreign Application Priority Data

May 16, 1994 [DE] Germany ............... 44 17 118.8

[51] Int. Cl.⁶ ..................................... B29C 55/12
[52] U.S. Cl. ................... 264/210.6; 264/173.15; 264/173.19; 264/210.7; 264/290.2
[58] Field of Search ................... 264/210.7, 210.6, 264/290.2, 331.17, 173.15, 173.19; 156/229, 244.11

[56] References Cited

U.S. PATENT DOCUMENTS

| | | | |
|---|---|---|---|
| 3,862,285 | 1/1975 | North et al. ............... | 264/180 |
| 3,937,762 | 2/1976 | Nahmias et al. . | |
| 4,000,102 | 12/1976 | Shima et al. ............... | 264/211 |
| 4,355,144 | 10/1982 | Shiga et al. . | |
| 4,622,237 | 11/1986 | Lori . | |
| 4,705,828 | 11/1987 | Matsumoto et al. . | |
| 4,921,749 | 5/1990 | Bossaert et al. . | |
| 5,091,237 | 2/1992 | Schloegl et al. . | |
| 5,118,566 | 6/1992 | Wilhelm et al. . | |
| 5,236,680 | 8/1993 | Nakazawa et al. . | |
| 5,236,683 | 8/1993 | Nakazawa et al. . | |
| 5,246,659 | 9/1993 | Crighton et al. . | |
| 5,252,384 | 10/1993 | Bothe et al. ............... | 428/212 |
| 5,292,563 | 3/1994 | Peiffer et al. ............... | 264/210.6 |
| 5,429,862 | 7/1995 | Schuhmann et al. . | |
| 5,451,455 | 9/1995 | Peiffer et al. . | |
| 5,496,600 | 3/1996 | Peiffer et al. ............... | 156/244.11 |

FOREIGN PATENT DOCUMENTS

| | | |
|---|---|---|
| 0 079 520 | 5/1981 | European Pat. Off. . |
| 0 115 940 | 8/1984 | European Pat. Off. . |
| 0 116 457 | 8/1984 | European Pat. Off. . |
| 0 236 945 | 9/1987 | European Pat. Off. . |
| 0 468 333 | 1/1990 | European Pat. Off. . |
| 0 479 101 A1 | 4/1990 | European Pat. Off. . |
| 0406642 | 1/1991 | European Pat. Off. . |
| 0 622 185 | 11/1994 | European Pat. Off. . |
| 38 01 535 | 7/1988 | Germany . |
| 62-151341 | 7/1987 | Japan .................................... 156/229 |
| 62-198440 | 9/1987 | Japan .................................... 264/290.2 |
| 91/5728 | 4/1992 | South Africa . |
| 94/2836 | 3/1995 | South Africa . |
| 1051576 | 12/1966 | United Kingdom ............. 264/290.2 |
| 2078158 A | 1/1982 | United Kingdom ............. 264/290.2 |

OTHER PUBLICATIONS

Ullmanns Encyclopädie der technischen Chemie 4 Aufl., Bd. 12, pp. 525–555.

*Primary Examiner*—Jeffery R. Thurlow
*Attorney, Agent, or Firm*—Connolly & Hutz

[57] ABSTRACT

A process for the production of a biaxially oriented propylene polymer film contains, in its single ply (or, if it is a multi-ply film, in its base ply) a low molecular weight resin, and the film has improved stretchability and other desirable physical properties, even though the propylene polymer of the sole or base ply is preferably a homopolymer. The n-heptane-insoluble fraction of the film has a chain isotacticity index, measured by means of $^{13}$C-NMR spectroscopy, of at least 85 to 94%. The sole or base ply contains less than 10% by weight of resin. The film is stretched in such a way that the product of tensile strength in the longitudinal and transverse direction is greater than 50,000 $(N/mm^2)^2$. The film is made by, among other steps, carrying out the orientation in the longitudinal and transverse directions such that the product of the longitudinal stretching ratio and the transverse stretching ratio is $\geq 60$.

8 Claims, 1 Drawing Sheet

PROCESS FOR THE PRODUCTION OF A BIAXIALLY HIGHLY ORIENTED POLYPROPYLENE FILM

FIELD OF THE INVENTION

The invention relates to a polypropylene film having an improved property profile with respect to mechanical properties, optical properties, friction and barrier properties with regard to water vapor and oxygen. The invention also relates to a process for the production of the film and the use thereof.

DESCRIPTION OF THE PRIOR ART

The improvement in the mechanical properties of films, in particular of films for the packaging sector, has recently become more important. For cost reasons and environmental reasons, the packaging industry requires increasingly thin films with unchanged or improved running characteristics in machines and unchanged or improved barrier properties, in particular with regard to the passage of water vapor and oxygen. Moreover, the films should have very good optical properties and contain as few migrating additives as possible in compliance with food regulations.

Owing to their poorer mechanical properties (in particular rigidity), thinner films have substantially poorer running characteristics in machines, in particular in today's high-speed wrapping machines. Furthermore, the barrier properties, too, decline disproportionately with the reduction in the film thickness. Owing to the poorer barrier properties of thin films, the protective effect of the film to prevent spoiling of the contents is greatly limited.

Improving the mechanical properties has long been the subject of intensive efforts, because this is directly related to the suitability for use and hence directly determines the processing behavior.

As described in the product surveys from the companies Mobil Plastics Europe and Hoechst AG, for example, the tensile modulus of elasticity (DIN 53 457, ASTM 882) of conventional biaxially-oriented polypropylene (boPP) films in the longitudinal and transverse direction is between 2,000 and 2,200N/mm$^2$ and between 3,500 and 4,200N/mm$^2$ respectively, regardless of the thickness. The tensile strength (DIN 53 455 or ASTM-D 882) is likewise not dependent on the thickness and is between 130 and 155N/mm$^2$ in the longitudinal direction and between 250 and 300N/mm$^2$ in the transverse direction.

The water vapor transmission (WVT) and oxygen transmission (TO) of bopp films decrease with increasing film thickness. In the conventional thickness range of bopp films (4 to 100 µm), there is, for example, approximately a hyperbolic relationship (WVT·d=const.) between the water vapor transmission (WVT) and the thickness (d). The constant essentially depends on the raw material composition and the process parameters. For bopp packaging films according to the prior art, the constant has a value of about: const.=28 g µm/m$^2$ d. The water vapor transmission was measured here according to DIN 53 122. The stated product surveys reveal that, for example, the water vapor transmission of a 25 µm thick bopp film is 1.1 g/m$^2$ d.

Furthermore, customers still wish to improve the optical properties (gloss, opacity). For certain applications, it is also necessary to reduce the friction of the films or to decrease the amount of lubricants while maintaining the same friction.

It is known that, in the case of bopp films, the mechanical properties can be improved either by means of process engineering or by means of raw material modifications or a combination of the two possibilities.

A possible method for the production of high-strength polypropylene films is a three-stage or multistage stretching process, as described, for example, in EP-B-0 116 457. However, such a production process has the disadvantage that it requires an additional apparatus for subsequent longitudinal stretching and is therefore very expensive. Moreover, it is very susceptible to breakdowns in the course of production, for example tears in the film.

Furthermore, such subsequently longitudinally stretched films exhibit longitudinal shrinkage which is substantially higher compared with only biaxially stretched films and which as a rule prevents the films from withstanding thermal drying, as is still usual in some cases, for example after application of adhesive materials, without undesirable shrink folds.

The modification of the raw materials used for the production of polypropylene films with various hydrocarbon resins is described, for example, in U.S. Pat. No. 3,937,762. Such modification of raw materials permits the production of polypropylene films whose sealability is substantially improved compared with films of unmodified raw materials. It is stated in the Examples that the film is stretched by a ratio of 6.2:1 in one direction and then by a ratio of 4:1 in the other direction.

EP-A-0 406 642 describes a bopp film having high mechanical strength. The high strength valves in the longitudinal direction are achieved if the base ply contains 5 to 30% by weight of a hydrocarbon resin and 0.01 to 1.0% by weight of a nucleating agent. The product of the stretching ratios in the longitudinal and transverse direction is at least 40 and at most 72. This publication provides no information about barrier properties, optical properties and the friction behavior. In the Examples, a resin concentration of 20% by weight is mentioned.

Such high resin concentrations lead to problems in film production. In particular, deposits occur after a short time on the screw of the plasticating extruder and on the rolls of the longitudinal stretching unit. Furthermore, the addition of nucleating agents in the stated concentration leads to optical film defects in the form of so-called "specks" and "bubbles", which of course are extremely undesirable. In addition, the regenerated material from such films can no longer be used owing to the tendency to agglomerate in the film production process. Furthermore, the stretching ratios stated in Examples 3 to 6 of EP-A-0 406 642 cannot be realized on any production machine at the conventional speeds with the homopolymer described there. Film constantly tears, particularly during transverse stretching.

Outstanding mechanical properties can be achieved by the combination of the addition of a resin to the raw material used with a subsequent longitudinal stretching process. A corresponding procedure is described in EP-A-0 079 520, where very high strength valves in the longitudinal direction are achieved. However, this process, too, has the disadvantage that an expensive subsequent longitudinal stretching process susceptible to faults is required.

U.S. Pat. No. 4,921,749 (=EP-A-0 247 898) describes a sealable bopp film having improved mechanical and optical properties. The sealability of the film and the water vapor and oxygen transmission are also improved. All improvements result from the addition of a low molecular weight resin to the base ply. The amount of resin is between 3 and 30% by weight. The resin has a molecular weight of substantially less than 5,000, preferably less than 1,000, and is, for example, 600. The softening point of the resin is 120° to 140° C. The film is biaxially oriented. A longitudinal stretching ratio of 5:1 and a transverse stretching ratio of 9:1 are mentioned in the Examples. The total area stretching ratio is accordingly 45.

EP-A-0 468 333 describes a sealable film having improved barrier properties with regard to the passage of water vapor and oxygen in combination with good sliding properties and low shrinkage values. The characterizing features of this bopp film are that it is composed of a base ply which comprises a polypropylene and a hydrocarbon resin having a softening point greater than 140° C., and that it has at least one sealable top ply which, if required, additionally contains a hydrocarbon resin. The base ply and the top ply contain at least one anti-blocking agent and/or one lubricant. This film is longitudinally stretched in a range of from 4:1 to 6:1 and transversely stretched by a ratio greater than 7.5:1. No information is given about the effect of the total area stretching ratio on film properties.

In U.S. Pat. No. 4,921,749 and EP-A-0 468 333, high concentrations of hydrocarbon resin are used in order to enhance the barrier properties. Such high resin contents lead to problems in film production. In particular, resin deposits occur on the screw of the extruder and on the longitudinal stretching rolls after a short time. Owing to the high resin contents, the films have high-temperature blocking values and exhibit a troublesome tendency to block during further processing.

EP-B-0 115 940 describes a highly isotactic propylene/ ethylene copolymer having an ethylene content of from 0.1 to 2 mol % and an isotacticity of more than about 94%, this lower limit moving upward, depending on the ethylene content. The ethylene content improves the stretchability, the impact strength and the transparency as well as the shrink resistance of films of such copolymers. These films are longitudinally stretched in the range of from 3.5 to 7 and transversely stretched in the range of from 7 to 12. The highly isotactic base raw material ensures high mechanical strengths in the longitudinal and transverse direction in combination with other advantageous film properties. In the Examples, the total area stretching ratio is 50.

U.S. Pat. No. 4,355,144 likewise describes propylene copolymers having a low ethylene content which are more readily stretchable than pure propylene homopolymers. The ethylene content is in a range of from 0.15 to 1.5 mol %. Films of the copolymers are longitudinally stretched in a range of from 3 to 10 times and transversely stretched in a range of from 3 to 10 times. In the Examples, the maximum area stretching ratio is 49. However, the mechanical strengths achieved are greatly in need of improvement and in particular the stated moduli of elasticity in the longitudinal direction are no longer acceptable on the basis of the present quality requirements.

There is therefore still a need for a biaxially oriented polypropylene film which is distinguished by high strength values and enhanced barrier properties with regard to the passage of water vapor and oxygen. The film should have a high gloss, no optical defects in the form of specks or bubbles, good scratch resistance, trouble-free running even with low film thickness on high-speed packaging machines and little opacity of the film. The disadvantages of the subsequent longitudinal stretching process, such as technical conversions in the production machine, breakdowns due to frequent tearing of the film and high residual shrinkage of the bopp films, are to be avoided. Furthermore, it must be ensured that the regenerated material can be added again in a concentration of 20 to 50% by weight, based on the total weight of the film. The film must be capable of being produced so that it runs reliably and withstands the process at production speeds of up to 400 m/min. Other physical film properties which are required with regard to the use thereof as packaging film and/or as laminating film (high-temperature blocking characteristics, friction behavior) must not be adversely affected.

SUMMARY OF THE INVENTION

The present invention seeks to fill this need with biaxially oriented propylene polymer film having at least one ply whose distinguishing features include the following: the n-heptane-insoluble fraction of the ply has a chain isotacticity index, measured by means of $^{13}$C-NMR spectroscopy, of at least 85 to 94%, and the ply contains a resin stretching aid in a minor amount not exceeding 10% by weight. (By "resin" is meant polymer such as a hydrocarbon resin with a relatively low molecular weight compared to the propylene polymer, e.g. a hydrocarbon resin having a molecular weight in the range of 300 to 8,000 or the like.) The film is stretched in such a way that the product of tensile strength in the longitudinal and transverse direction (i.e. the mathematical product obtained when these two quantities are multiplied together) is greater than 50,000 (N/mm$^2$)$^2$.

According to the invention, the film may be single-ply having only the resin-containing ply described below. In a preferred embodiment, the film has a plurality of plies, and the resin-containing ply referred to above is then called the "base ply". In this preferred embodiment, the base ply is combined with at least one top ply or, more typically, top plies on both sides. In a further embodiment, the film has on its base ply at least one interlayer or if required interlayers on both sides.

The base ply (or single ply, if there are no top plies) of the film contains in general at least 85% by weight, preferably 90 to 99% by weight, in particular 95 to 98% by weight, based in each case on the base ply, of a propylene polymer (most preferably a homopolymer) described below and additives which are optionally added, each in effective amounts.

DETAILED DESCRIPTION

The propylene polymer of the base ply (or single ply, if there are no top plies) is preferably essentially a homopolymer; that is, there are preferably essentially no other repeating units, since minor amounts of ethylene units (e.g. 0.1 or 0.15 to 2 mol-%) or the like are not required in this base or single ply. The film having the homopolymeric ply still has good stretchability and excellent physical properties. Properties of the aforementioned propylene homopolymer include a melting point of 140° to 165° C., preferably 155° to 162° C., and a melt flow index (measured according to DIN 53 735 under a load of 21.6N and at 230° C.) of 1.0 to 10 g/10 min, preferably 1.5 to 6 g/10 min. The n-heptane-soluble fraction of the propylene polymer is in general 1 to 10% by weight, based on the starting polymer. The n-heptane-insoluble fraction of the propylene homopolymer is isotactic. The chain isotacticity index of the n-heptane-insoluble fraction of the homopolymer, determined by means of $^{13}$C-NMR spectroscopy, is 85 to 94%, preferably 90 to 93%.

The molecular weight distribution of the propylene homopolymer can vary within wide limits, depending on the field of use. The ratio of the weight average molecular weight $M_w$ to the number average molecular weight $M_n$, is in general between 2 and 15.

In a preferred embodiment of the film according to the invention, the ratio of the weight average molecular weight $M_w$ to the number average molecular weight $M_n$ is 2 to 6, very particularly preferably 3.5 to 5. Such a narrow molecular weight distribution of the propylene polymer of the base ply is achieved, for example, by peroxidic degradation thereof.

A measure of the degree of degradation of the polymer is the so-called degradation factor A, which indicates the relative change in the melt flow index according to DIN 53 735 of the polypropylene, relative to the starting polymer.

$$A = \frac{MFI_2}{MFI_1}$$

$MFI_1$=Melt flow index of the propylene polymer before the addition of the organic peroxide $MFI_2$=Melt flow index of the propylene polymer degraded by a peroxide mechanism.

In general, the degradation factor A of the propylene polymer used is in the range from 3 to 15, preferably 6 to 10.

Dialkyl peroxides are particularly preferred as organic peroxides, an alkyl radical being understood as meaning the usual saturated straight-chain or branched lower alkyl radicals having up to six carbon atoms. 2,5-Dimethyl-2,5-di (tert-butylperoxy)-hexane or di-tert-butyl peroxide are particularly preferred.

As indicated previously, the single ply or base ply of the film contains an effective amount of the low molecular weight resin. This effective amount ranges up to 10% by weight, but is preferably from 1 to 8% by weight, in particular from 1 to 5% by weight, based in each case on the weight of the base (or single) ply.

Resins, in this context, are low molecular weight polymers whose molecular weight is in general in a range of from 300 to 8,000, preferably from 400 to 5,000, in particular from 500 to 2,000. Thus, the molecular weight of the resin is substantially lower than (e.g.<10% of) that of the propylene polymer, which in general has a molecular weight of more than 100,000. The softening point of the resin is between 60° and 180° C. (measured according to DIN 1995-U4, corresponding to ASTME-28). Among the many low molecular weight resins, the hydrocarbon resins are preferred, specifically in the form of the petroleum resins, styrene resins, cyclopentadiene resins and terpene resins (these resins are described in Ullmanns Encyklopädie der techn. Chemie, 4th Edition, Volume 12, pages 525 to 555).

Particularly preferred resins are hydrocarbon resins. The hydrocarbon resins are optionally hydrogenated, partially or completely. Suitable resins are in principle synthetic resins or resins of natural origin. It has proven particularly advantageous to use resins having a softening point$\geq$60° C. (measured according to DIN 1995-U4 or ASTM E-28), those having a softening point of 70° to 180° C., in particular 80° to 160°, being preferred.

The petroleum resins are those hydrocarbon resins which are produced by polymerization of deep-decomposed crude oil materials in the presence of a catalyst. These crude oil materials usually contain a mixture of resin-forming substances, such as styrene, methylstyrene, vinyltoluene, indene, methylindene, butadiene, isoprene, piperylene and pentylene. The styrene resins are homopolymers of styrene or copolymers of styrene with other monomers, such as methylstyrene, vinyltoluene and butadiene. The cyclopentadiene resins are cyclopentadiene homopolymers or cyclopentadiene copolymers, which are obtained from coal tar distillates and separated crude oil gas. These resins are produced by keeping the materials which contain cyclopentadiene at an elevated temperature for a prolonged period of time. Dimers, trimers or oligomers can be obtained, depending on the reaction temperature.

The terpene resins are polymers of terpenes, i.e. hydrocarbons of the formula $C_{10}H_{16}$, which are contained in almost all essential oils or oil-containing resins from plants, and phenol-modified terpene resins. Specific examples of terpenes which may be mentioned are pinene, α-pinene, dipentene, limonene, myrcene, camphene and similar terpenes. The hydrocarbon resins are also sometimes called modified hydrocarbon resins. The modification is effected in general by reacting the raw materials before the polymerization, by introducing specific monomers or by reacting the polymerized product, in particular hydrogenations or partial hydrogenations being carried out.

In addition, styrene homopolymers, styrene copolymers, cyclopentadiene homopolymers, cyclopentadiene copolymers and/or terpene polymers, each having a softening point of above 60° C., are used as hydrocarbon resins (in the case of the unsaturated polymers, the hydrogenated product is preferred).

Furthermore, the resin-containing ply (e.g. the base ply) optionally contains conventional additives, such as antistatic agents, anti-blocking agents, lubricants, stabilizers, neutralizing agents and pigments, each in effective amounts, and also regenerated film material.

The amounts stated below with regard to the additives are always based on the weight of the total film.

Preferred antistatic agents are alkali metal alkanesulfonates, polyethermodified, i.e. ethoxylated and/or propoxylated polydiorganosiloxanes (polydialkylsiloxanes, polyalkylphenylsiloxanes and the like) and/or the essentially straight-chain and saturated aliphatic, tertiary amines which have an aliphatic radical having 10 to 20 carbon atoms and are substituted by ω-hydroxy-($C_1$–$C_4$)-alkyl groups, N,N-bis-(2-hydroxyethyl)-alkylamines having 10 to 20 carbon atoms, preferably 12 to 18 carbon atoms, in the alkyl radical being particularly suitable. The effective amount of antistatic agent is in the range from 0.05 to 0.5% by weight.

Suitable antiblocking agents are inorganic additives, such as silica, calcium carbonate, magnesium silicate, aluminum silicate, calcium phosphate and the like, and/or incompatible organic polymers, such as polyamides, polyesters, polycarbonates and the like, preferably benzoguanamine/ formaldehyde polymers, silica and calcium carbonate. The effective amount of antiblocking agent is in the range from 0.1 to 2% by weight, preferably 0.1 to 0.8% by weight. The mean particle size is between 1 and 6 μm, in particular 2 and 5 μm, particles having a spherical shape, as described in EP-A-0 236 945 and DE-A-38 01 535, being particularly suitable.

Lubricants suitable for use as additives in this invention include higher aliphatic amides, higher aliphatic esters, waxes and metal soaps as well as polydimethylsiloxanes. The effective amount of lubricant is in the range from 0.01 to 3% by weight, preferably 0.02 to 1% by weight. The addition of higher aliphatic amides in the range from 0.01 to 0.25% by weight to the base ply is particularly suitable. A particularly suitable aliphatic amide is erucamide. The addition of polydimethylsiloxanes in the range from 0.02 to 2.0% by weight is preferred, in particular polydimethylsiloxanes having a viscosity from 5,000 to 1,000,000 $mm^2/s$.

The stabilizers suitable for use as additives in this invention are generally those compounds (many of which are commercially available as stabilizers) having a stabilizing action for ethylene polymers, propylene polymers and other α-olefin polymers. The added amount thereof is between 0.05 and 2% by weight. Phenolic stabilizers, alkali metal stearates/alkaline earth metal stearates and/or alkali metal carbonates/alkaline earth metal carbonates are particularly suitable. Phenolic stabilizers in an amount from 0.1 to 0.6% by weight, in particular 0.15 to 0.3% by weight, and with a molecular mass of more than 500 g/mol are preferred. Pentaerythrityl tetrakis-3-(3,5-di-tertiary-butyl-4-hydroxyphenyl)-propionate or 1,3,5-trimethyl-2,4,6-tris(3, 5-di-tertiary-butyl-4-hydroxybenzyl)benzene are particularly advantageous.

Neutralizing agents suitable for use as additives in this invention preferably include dihydrotalcite, calcium stearate and/or calcium carbonate having a mean particle size of at most 0.7 μm, an absolute particle size of less than 10 μm and a specific surface area of at least 40 $m^2$/g. The neutralizing agent is in general added in an amount of 0.002 to 0.1% by weight.

Pigments which are present in nontransparent embodiments of this invention comprise those particles which essentially do not lead to vacuole formation during stretching. The coloring effect of the pigments is caused by the particles themselves. The term "pigment" is in general associated with a particle size of 0.01 to at most 1 μm and thus covers both so-called "white pigments", which color the films white, and "colored pigments", which impart a color to the film or render it black. In general, the mean particle diameter of the pigments is in the range from 0.01 to 1 μm, preferably 0.01 to 0.5 μm.

Conventional pigments are materials such as, for example, alumina, aluminum sulfate, barium sulfate, calcium carbonate, magnesium carbonate, silicates, such as aluminum silicate (kaolin clay) and magnesium silicate (talc), silica and titanium dioxide, among which calcium carbonate, silica and titanium dioxide are particularly preferred.

When one or more pigments are present as additives, the resin-containing ply (typically the base ply) contains pigments in general in an amount of 1 to 25% by weight, in particular 2 to 20% by weight, preferably 5 to 15% by weight, based in each case on the ply. Preferred pigments are white pigments, in particular $TiO_2$, silica and $BaSO_4$. These pigments preferably have a mean particle diameter of 0.01 to 0.7 μm, in particular 0.01 to 0.4 μm.

Furthermore, so-called regenerated film material in an amount of up to 60% by weight, preferably from 1 to 30% by weight, is another optional additive. Regenerated film material is, for example, film trimmings produced on trimming the edge regions or in the manufacturing of products. The base ply of the film thus contains a very small amount of the top ply polymer present in the regenerated material, for example propylene copolymers which can be two-unit polymers (bipolymers) or terpolymers. Processing the regenerated material in this manner has economic advantages.

In a preferred embodiment, the polypropylene film according to the invention comprises at least one sealable or nonsealable top ply or optionally top plies sealable or nonsealable on both sides, which in general contains or contain 75 to 100% by weight, preferably 90 to 99.5% by weight, based in each case on the weight of the top ply, of polymers of α-olefins having 2 to 10 carbon atoms.

Examples of such a-olefinic polymers include homopolymers and copolymers (two-unit polymers or bipolymers, also terpolymers, etc.), for example:

a propylene homopolymer or
a bipolymer of
  ethylene and propylene or
  ethylene and 1-butylene or
  propylene and 1-butylene or
a terpolymer of
  ethylene and propylene and 1-butylene or
a mixture of two or more of the stated homo-, co- and terpolymers or
a blend of two or more of the stated homo-, co- and terpolymers, if necessary mixed with one or more of the stated homo-, co- and terpolymers, in particular a propylene homopolymer or
a random ethylene/propylene copolymer having
  an ethylene content of 1 to 10% by weight, preferably 2.5 to 8% by weight, or
a random propylene/1-butylene copolymer having
  a butylene content of 2 to 25% by weight, preferably 4 to 20% by weight,
based in each case on the total weight of the copolymer, or a random ethylene/propylene/1-butylene terpolymer having
  an ethylene content of 1 to 10% by weight, preferably 2 to 6% by weight, and
  a 1-butylene content of 2 to 20% by weight, preferably 4 to 20% by weight,
based in each case on the total weight of the terpolymer, or
a blend of an ethylene/propylene/1-butylene terpolymer and a propylene/1-butylene bipolymer
  having an ethylene content of 0.1 to 7% by weight and a propylene content of 50 to 90% by weight and a 1-butylene content of 10 to 40% by weight, based in each case on the total weight of the polymer blend, being preferred.

The propylene polymer used in the top ply of nonsealable embodiments contains predominantly (at least 90%) propylene and has a melting point of 140° C. or higher, preferably 150° to 170° C., isotactic homopolypropylene having an n-heptane-soluble fraction of 6% by weight or less, based on the isotactic homopolypropylene, being preferred. The homopolymer has in general a melt flow index of 1.5 g/10 min to 20 g/10 min, preferably 2.0 g/10 min to 15 g/10 min.

The copolymers and blends of copolymers (e.g. blends of bipolymers and terpolymers) used in the top ply of sealable embodiments and described above have in general a melt flow index of 1.5 to 30 g/10 min, preferably 3 to 15 g/10 min. The melting point is in the range from 120° to 150° C. The melt flow index stated above is measured at 230° C. and under a force of 21.6N (DIN 53 735).

All top ply polymers described can optionally be degraded by a peroxide mechanism in the manner described above for the base ply. The degradation factor for the top ply polymers is in general in a range from 3 to 15, preferably 6 to 10.

In a dull embodiment, the top ply additionally contains a high density polyethylene (HDPE) which is mixed or blended with the top ply polymers described above. The composition and details of the dull top plies are described, for example, in German Patent Application P 43 13 430.0 (not yet published, corresponding to U.S. Ser. No. 231,761), which is incorporated herein by reference.

If required, the additives described above for the single ply or base ply, such as antistatic agents, antiblocking agents, pigments, lubricants, neutralizing agents and stabilizers, can be added to the top ply or top plies. In a preferred embodiment, the top ply or plies contains or contain a combination of antiblocking agent, preferably $SiO_2$, and lubricant, preferably polydimethylsiloxane. The above data in % by weight thus relate analogously to the weight of the top ply.

The film according to the invention comprises at least the single or base ply described above, more preferably the base ply and at least one top ply. Depending on its intended use, the film is optionally provided with a further top ply on the opposite side. In another embodiment, an interlayer or interlayers can be applied on one or both sides between the base ply and the top ply or plies.

Preferred embodiments of the polypropylene film are three-ply. The structure, thickness and composition of a second top ply can be chosen independently of the top ply already present, and the second top ply may likewise contain one of the polymers or polymer mixtures which are described above but which need not be identical to that of the first top ply. The second top ply may, however, also contain other conventional top ply polymers.

The thickness of the top ply or plies is greater than 0.1 μm and is preferably in the range from 0.2 to 3 μm, in particular 0.3 to 1.5 μm, and top plies on both sides may be of equal or different thickness.

The interlayer or interlayers generally comprise the α-olefinic polymers described for the top plies. In a particularly preferred embodiment, the interlayer or interlayers comprises or comprise the propylene polymer described for the base ply. The interlayer or interlayers also optionally contain the conventional additives described for the individual plies. The thickness of the interlayer or interlayers is greater than 0.3 µm and is preferably in the range from 1.0 to 15 µm, in particular 1.5 to 10 µm.

The total thickness of the polypropylene film according to the invention can vary within wide limits and depends on the intended use. It is preferably 4 to 60 µm, in particular 5 to 30 µm, preferably 6 to 25 µm, the base ply accounting for about 40 to 100% of the total film thickness.

The invention furthermore relates to a process for the production of the film according to the invention by the extrusion process known per se. In this process, the polymer of the film or of the individual plies is compressed and liquefied in an extruder, as is usual in the extrusion process, and the optionally included additives can already be present in the polymer or in the polymer mixture or added via a masterbatch technique. The melt or melts corresponding to the film or the individual plies of the film is or are then simultaneously forced through a flat die (slot die), and the extruded film is drawn off on one or more draw-off rollers, during which it cools and solidifies.

The film thus obtained is then stretched longitudinally and subsequently transversely relative to the extrusion direction, which leads to orientation of the molecular chains. The longitudinal stretching is expediently carried out with the aid of two rollers running at different speeds corresponding to the desired stretching ratio, and the transverse stretching is carried out with the aid of an appropriate tenter frame. According to the invention, the film is stretched in the longitudinal direction by a ratio of from 6:1 to 9:1, which is very high compared with the prior art, and is transversely stretched by a ratio of from 7.5:1 to 15:1. Preferably, the film is stretched in the longitudinal direction in a range of from 6.5:1 to 8:1 and in the transverse direction in a range of from 8:1 to 13:1. In order to achieve the properties essential to the invention, the longitudinal and transverse stretching ratios must be chosen so that the product of the longitudinal stretching ratio and the transverse stretching ratio (area stretching ratio) is $\geq 60$, preferably in the range from 62 to 100, in particular 65 to 90. It has been found that these high area stretching ratios of at least 60 can surprisingly be realized without tearing of the film in the transverse direction when a relatively small amount of a resin (of the type described above) is added to the base ply as a stretching aid. In general, the films exhibit an increase in tendency to splice with an increasing degree of longitudinal stretching. The tendency to splice is reduced by the addition of the resin as a stretching aid.

It has surprisingly been found that on adding these relatively small amounts of resin, both the stretchability in the longitudinal direction is substantially improved and the subsequent transverse orientation of the highly longitudinally oriented film is possible without problems, so that a high area stretching ratio of $\geq 60$ can be realized without tearing of the films, even when the propylene polymer of the base or single ply is a homopolymer.

The biaxial stretching of the film is followed by its thermofixing (heat treatment), the film being kept for about 0.5 to 10 s at a temperature of 60° to 160° C., preferably 90° to 150° C. The film is then wound up in the usual manner by means of a winding device.

It has proved to be advantageous to keep the draw-off roller or rollers, by means of which the extruded film is also cooled and solidified, at a temperature of 20° to 90° C.

The temperatures at which longitudinal and transverse stretching are carried out may be varied. In general, longitudinal stretching is carried out at 80° to 150° C. and transverse stretching preferably at 130° to 180° C.

As mentioned above, after the biaxial stretching one or both surfaces of the film is or are optionally corona-treated or flame-treated by one of the known methods.

In an expedient corona treatment, the film is passed between two conductor elements serving as electrodes, such a high voltage, in most cases alternating voltage (about 10 to 20 kV and 20 to 40 kHz), being applied between the electrodes that spray discharges or corona discharges can take place. Due to the spray discharge or corona discharge, the air above the film surface is ionized and reacts with the molecules of the film surface so that polar spots are formed in the essentially nonpolar polymer matrix.

For a flame treatment with a polarized flame (cf. U.S. Pat. No. 4,622,237), a direct electric voltage is applied between a burner (negative pole) and a cooling roller. The level of the applied voltage is between 500 and 3,000 V, preferably in the range from 1,500 to 2,000 V. Owing to the applied voltage, the ionized atoms experience increased acceleration and impinge at higher kinetic energy on the polymer surface. The chemical bonds within the polymer molecule are more readily broken, and the formation of free radicals proceeds more rapidly. The thermal stress on the polymer is in this case far less than in the standard flame treatment, and films can be obtained in which the sealing properties of the treated side are even better than those of the untreated side.

The film according to the invention is distinguished by outstanding mechanical properties in the longitudinal and transverse direction and by excellent running reliability during the production process.

It has been found that no modifications to the apparatus, such as, for example, subsequent longitudinal stretching, are required for achieving these excellent mechanical properties, even though the propylene polymer of the base or single ply is a homopolymer or essentially a homopolymer. The ability to use a propylene homopolymer in this manner is advantageous. The known copolymers, which are more readily stretchable, have a significantly poorer transparency. Moreover, the mechanical properties of the known copolymers deteriorate in the longitudinal and transverse direction with increasing ethylene content. This means that a deterioration in the mechanical and optical properties of the film must be accepted for greater process reliability (fewer tears, etc.) through the improved stretchability of the copolymers. No one skilled in the art could have anticipated that, by means of the addition of a small amount of resin, the stretching conditions and the area stretching ratio can be changed in such a way that such strong films can be produced with reliable running characteristics and therefore economically using a propylene homopolymer, i.e. using a standard raw material as has been used for many years for the production of boPP films. This standard raw material is made from essentially 100% propylene, no comonomer being deliberately added, so that the amount of conomoner present, if any, would be in the nature of an incidental impurity (<0.1 mole-%).

Furthermore, the film according to the invention is surprisingly distinguished by substantially improved water vapor and oxygen barrier properties compared with known resin-containing films. A very wide range of measures for improving the barrier properties has been described to date, but never a relationship between the barrier properties of the film and its area stretching ratio. Surprisingly, the addition of resin and the increased area stretching ratio were found to have a synergistic effect on the barrier properties.

The films according to the invention are furthermore distinguished by very high film rigidity, so that, even in a thickness of significantly less than 20 µm, they are still sufficiently rigid to be processed on the modern high-speed packaging machines. With this film, it is therefore possible further to reduce the plastics content of packaging without there being any losses in the quality of the packaging. The addition of resin and the increased area stretching ratio also surprisingly have a synergistic effect on the mechanical properties of the film.

Furthermore, it was found that the gloss and the coefficient of friction of the film according to the invention was also improved by the greater stretching, i.e. with the same formulation with regard to raw materials and additives, the film has a higher gloss and a lower coefficient of friction the higher the area stretching ratio. The improved coefficient of friction permits reduction in the amount of lubricant to be used and thus, on the one hand, a cost saving and, on the other hand, reduced global migration, which is desirable for reasons relating to food regulations.

Table 1 below summarizes the most important film properties.

TABLE 1

| | Range according to the invention | Preferably | Unit | Method of measurement |
|---|---|---|---|---|
| Modulus of elasticity in the longitudinal direction | >2,400 to 3,500 | 2,500 to 3,000 | N/mm² | DIN 53 457 or ASTM 882 |
| Modulus of elasticity in the transverse direction | >4,000 to 6,000 | 4,200 to 5,500 | N/mm² | DIN 53 457 or ASTM 882 |
| Water vapor transmission | ≦24/ thickness in μm | ≦23/ thickness in μm | g/m² d | DIN 53 122 Part 2 |
| Tensile strength, longitudinal | ≧170 | ≧175 | N/mm² | DIN 53 455 |
| Tensile strength, transverse | ≧290 | ≧295 | N/mm² | DIN 53 455 |
| Gloss (measuring angle 20°) | ≧110 | ≧120 | | DIN 67 530 |
| High-temperature blocking values | ≦10 | ≦5 | N | |
| Opacity | ≦2.5 | ≦2.3 | % | ASTM-D 1003-52 |
| Coefficient of friction | ≦0.3 | ≦0.27 | | DIN 53 375 |

The following methods of measurement were used for characterizing the raw materials and the films:

Melt Flow Index

The melt flow index was measured according to DIN 53 735 at 21.6N load and 230° C.

Melting Point

DSC measurement, maximum of the melting curve, heating rate 20° C./min.

Water Vapor and Oxygen Transmission

The water vapor transmission is determined according to DIN 53 122 Part 2. The oxygen barrier effect is determined according to Draft DIN 53 380 Part 3 at an atmospheric humidity of 53%.

Opacity The opacity of the film was measured according to ASTM-D 1003-52.

Gloss

The gloss was determined according to DIN 67 530. The reflector value was measured as an optical characteristic of the surface of a film. Analogously to the standards ASTM-D 523-78 and ISO 2813, the angle of incidence was set at 60° or 85°. At the set angle of incidence, a light beam strikes the planar test surface and is reflected or scattered by the latter. The light beams incident on the photoelectronic receiver are indicated as a proportional electric value. The measured value is dimensionless and must be quoted with the angle of incidence.

Friction

The friction was measured according to DIN 53 375 14 days after production at the earliest.

Tensile Strength, Elongation at Break

The tensile strength and the elongation at break are determined according to DIN 53 455.

Modulus of Elasticity

The modulus of elasticity is determined according to DIN 53 457 or ASTM 882 14 days after production at the earliest.

Determination of the High-Temperature Blocking Characteristics

To measure the high-temperature blocking characteristics, two wooden blocks adhesively bonded to felt on one side and having the dimensions 72 mm×41 mm×13 mm are wrapped and sealed in the film to be measured. A weight of 200 g is placed on the wooden blocks positioned so that the felt coverings face one another, and this set-up is introduced into a heating oven preheated to 70° C. and is left there for 2 hours. Thereafter, cooling is effected for 30 minutes to room temperature (21° C.), the weight is removed from the wooden blocks and the upper block is pulled off the lower block by means of a mechanical apparatus. The evaluation is effected over 4 individual measurements, from which a maximum pull-off force (measured in N) is then determined. The specification is met if none of the individual measurements is above 5N.

Molecular Weight Determination

The mean molecular mass and the mean inhomogeneity of the molecular mass were determined analogously to DIN 55 672, Part 1, by means of gel permeation chromatography. Instead of THF, ortho-dichlorobenzene was used as the eluant. Since the olefinic polymers to be investigated are not soluble at room temperature, the entire measurement is carried out at an elevated temperature ($\approx 135°$ C.).

Isotactic Content

Both the isotactic content of the homopolymer and the isotactic content of the film can be characterized approximately by means of the insoluble fraction of the raw material or of the film in a suitable solvent. It has proven expedient to use n-heptane. Usually, a Soxhlet extraction with boiling n-heptane is carried out. In order to obtain good reproducibility, it is expedient to fill the Soxhlet apparatus with a pellet instead of granules. The thickness of the pellet should not exceed 500 micrometers. For the quantitative determination of the atactic content of the homopolymer, it is of decisive importance to ensure sufficient extraction time. As a rule, the extraction time is in the range from 8 to 24 hours.

The operational definition of the isotactic content $PP_{iso}$ in percent is given by the ratio of the weights of the dried n-heptane-insoluble fraction to the sample weight:

$$PP_{iso} = 100 \times (\text{n-heptane-insoluble fraction/sample weight})$$

An analysis of the dried n-heptane extract shows that, as a rule, it does not comprise pure atactic propylene homopolymer. In the extraction, aliphatic and olefinic oligomers, in particular isotactic oligomers, and also possible additives, such as, for example, hydrogenated hydrocarbon resins, are also measured.

Chain Isotacticity Index

The isotactic content $PP_{iso}$ defined above is not sufficient for characterizing the chain isotacticity of the homopolymer. It proves to be useful to determine the chain isotacticity index II of the homopolymer by means of high-resolution $^{13}$C-NMR spectroscopy, the NMR sample chosen being not the original raw material but its n-heptane-insoluble fraction. To characterize the isotacticity of polymer chains, $^{13}$C-NMR spectroscopic triad isotacticity index II (triads) is used in practice.

Determination of the Triad-Related Chain Isotacticity Index II (Triads)

The chain isotaxy index II (triads) of the n-heptane-insoluble content of the homopolymer and of the film is determined from the $^{13}$C-NMR spectrum of said homopolymer or of said film. The intensities of triad signals which result from the methyl groups with different local environments are compared.

With regard to the evaluation of the $^{13}$C-NMR spectrum, a distinction must be made between two cases:

A) The raw material investigated is a propylene homopolymer without a random $C_2$ content.

B) The raw material investigated is a propylene homopolymer having a low random $C_2$ content, referred to below as $C_2$-$C_3$-copolymer.

Case A:

The chain isotacticity index of the homopolymer is determined from its $^{13}$C-NMR spectrum. The intensities of the signals which result from the methyl groups with different environments are compared. In the $^{13}$C-NMR spectrum of a homopolymer, essentially three groups of signals, so-called triads, occur.

1. At a chemical shift of about 21 to 22 ppm, the "mm-triad" occurs and is assigned to the methyl groups having methyl groups directly adjacent on the left and right.
2. At a chemical shift of about 20.2 to 21 ppm, the "mr-triad" occurs and is assigned to the methyl groups having methyl groups directly adjacent on the left or right.
3. At a chemical shift of about 19.3 to 20 ppm, the "rr-triad" occurs and is assigned to the methyl groups without directly adjacent methyl groups.

The intensities of the signal groups assigned are determined as the integral of the signals. The chain isotacticity index is defined as follows:

$$II(\text{triads}) = \frac{J_{mm} + 0.5 J_{mr}}{J_{mm} + J_{mr} + J_{rr}} \cdot 100$$

where $J_{mm}$, $J_{mr}$ and $J_{rr}$ are the integrals of the signal groups assigned.

Case B

BRIEF DESCRIPTION OF THE DRAWING

Figure 1:
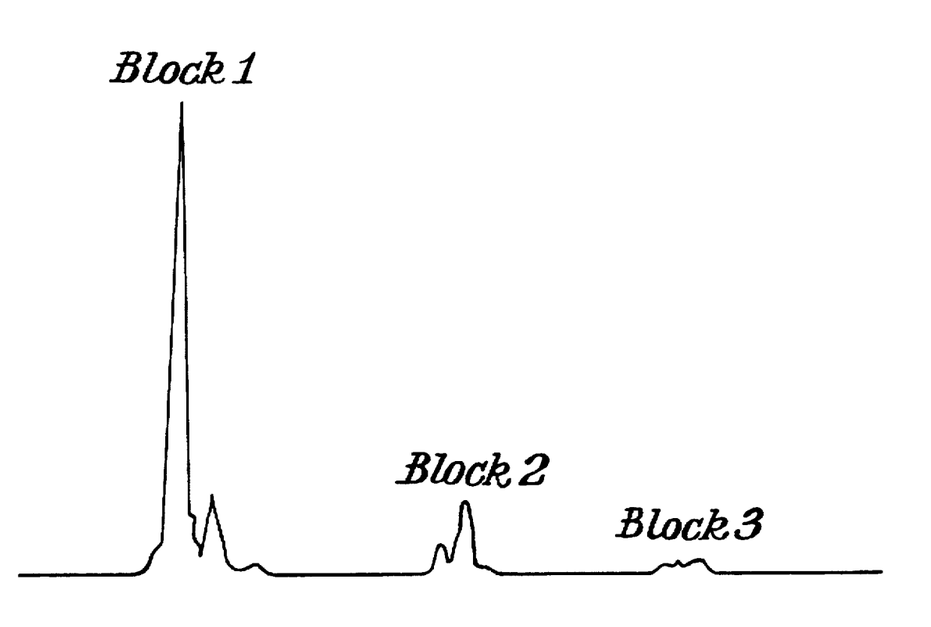

FIG. 1 is a schematically enlarged representation of a $^{13}$C-NMR spectrum of an ethylene/propylene copolymer. The chemical shift of the methyl groups of interest is in the range from 19 to 22 ppm. As can be seen in FIG. 1, the spectrum of the methyl groups can be divided into three blocks. In these blocks, the $CH_3$ groups appear in triad sequences, whose assignment to the local environments is explained in detail below:

Block 1

$CH_3$ groups in the PPP sequence (mm-triad)

Block 2

$CH_3$ groups in the PPP sequence (mr- or rm-triads)

and $CH_3$ groups in the EPP sequence (m-chain):

Block 3

$CH_3$ groups in the PPP sequence (rr-triads):

$CH_3$ groups in an EPP sequence (r-chain):

$CH_3$ groups in an EPE sequence:

In the determination of the triad-related chain isotacticity index II (triads) of the n-heptane-insoluble content of an ethylene/propylene copolymer, only PPP triads are considered, i.e. only those propylene units which are present between two adjacent propylene units (cf. also EP-B-0 115 940, page 3, lines 48 and 49).

The definition of the triad isotacticity index of an ethylene/propylene copolymer is:

$$II\ (\text{triads}) = 100 \times (J_{mm}/J_{PPP})$$

Calculation of the chain isotacticity index of an ethylene/propylene copolymer:

1. $J_{mm}$ is given by the peak integral of block 1.
2. Calculate the integral ($J_{total}$) of all methyl group peaks in blocks 1, 2 and 3.
3. By simple considerations, it is possible to show that $J_{PPP} = J_{total} - J_{EPP} - J_{EPE}$.

Sample Preparation and Measurement 60 to 100 mg of polypropylene are weighed into a 10 mm NMR tube and hexachlorobutadiene and tetrachloroethane are added in a ratio of about 1.5:1 until a level of about 45 mm is reached. The suspension is kept at about 140° C. until (as a rule about one hour) a homogeneous solution has formed. In order to accelerate the dissolution process, the sample is stirred from time to time with a glass rod. The $^{13}$C-NMR spectrum is recorded at an elevated temperature (as a rule 365K) under standard measuring conditions (semiquantitatively).

EXAMPLE 1

A transparent three-ply film having a symmetrical structure and a total thickness of 16 µm was produced by coextrusion and subsequent stepwise orientation in the longitudinal and transverse direction. The top plies each had a thickness of 0.6 µm.

A-base ply:

| | |
|---|---|
| 99.85% by weight | of isotactic polypropylene from Hoechst AG, having the brand name ® Hostalen PPR 1060 F |
| 0.15% by weight | of N,N-bisethoxyalkylamine |
| 3% by weight | of hydrocarbon resin ® ECR 356 from Exxon |

The n-heptane-insoluble fraction of the film had a chain isotaxy index of 92%, measured by means of $^{13}$C-NMR spectroscopy.

B-top plies:

| | |
|---|---|
| 50% by weight | of a random ethylene/propylene/butylene terpolymer having a $C_2$ content of 3% by weight and a $C_4$ content of 10% by weight |
| 48.87% by weight | of a random ethylene/propylene copolymer having a $C_2$ content of 4.5% by weight |
| 0.33% by weight | of $SiO_2$ as an antiblocking agent, having a mean particle size of 2 μm |
| 0.80% by weight | of polydimethylsiloxane having a viscosity of 30,000 mm$^2$/s |

The production conditions in the individual process steps were:

| Extrusion: | Temperatures | |
|---|---|---|
| | A-ply: | 280° C. |
| | B-plies: | 280° C. |
| | Temperature of the draw-off roller: | 30° C. |
| Longitudinal stretching: | Temperature: | 115° C. |
| | Longitudinal stretching ratio: | 6.5 |
| Transverse stretching: | Temperature: | 160° C. |
| | Transverse stretching ratio: | 10.8 |
| Fixing: | Temperature: | 110° C. |
| | Convergence: | 15% |

The transverse stretching ratio $\lambda_T=10.8$ is an effective value. This effective value is calculated from the final film width W, minus twice the seam width w, divided by the width of the longitudinally stretched film C, likewise minus twice the seam width w.

| Numerical data: | Final film width | W = 4,960 mm |
|---|---|---|
| | Final film thickness | d = 16 μm |
| | Seam width | w = 40 mm |
| | Width of the longitudinally stretched film | C = 530 mm |

EXAMPLE 2

A three-ply film having a total thickness of 16 μm and top ply thicknesses of 0.6 μm each was produced as in Example 1. The raw material composition for the base ply and for the top plies is also the same as in Example 1. Only the conditions during longitudinal and transverse stretching were changed:

| Longitudinal stretching: | Temperature: | 115° C. |
|---|---|---|
| | Longitudinal stretching ratio: | 7.5 |
| Transverse stretching: | Temperature: | 160° C. |
| | Transverse stretching ratio: | 10.8 |

EXAMPLE 3

The resin content of the base ply was increased from 3 to 5% by weight compared with Example 1.

EXAMPLE 4

Example 1 was repeated. The longitudinal stretching ratio was increased from 6.5 to 7.5 compared with Example 3.

COMPARATIVE EXAMPLE 1

Example 1 was repeated, but process conditions according to the prior art were chosen:

The production conditions in the individual process steps were:

| Extrusion: | Temperature | |
|---|---|---|
| | A ply: | 280° C. |
| | B plies: | 280° C. |
| | Temperature of the draw-off roller: | 30° C. |
| Longitudinal stretching: | Temperature: | 115° C. |
| | Longitudinal stretching ratio: | 5.0 |
| Transverse stretching: | Temperature: | 160° C. |
| | Transverse stretching ratio: | 10.8 |
| Fixing: | Temperature: | 110° C. |
| | Convergence | 20% |

COMPARATIVE EXAMPLE 2

Example 1 was repeated. However, the film contained no hydrocarbon resin. Owing to frequent tears in the longitudinal transverse stretching, no film running was achieved.

COMPARATIVE EXAMPLE 3

Comparative Example 1 was repeated. However, the base ply contained no hydrocarbon resin.

TABLE 2

| | Film thickness μm | Resin content | Area stretching ratio | Modulus of elasticity DIN 53 457 longitudinal/-transverse N/mm$^2$ | Tensile strength DIN 53 455 longitudinal/-transverse N/mm$^2$ | Gloss DIN 67 530 (measuring angle 20°) | Water vapor transmission DIN 53 122 g/m$^2$ d | Opacity ASTM D 1003-52 % | Friction 14 days after production A side/D side | High-temperature blocking characteristics N |
|---|---|---|---|---|---|---|---|---|---|---|
| E1 | 16 | 3 | 70 | 2,600/4,800 | 180/310 | 130 | 1.3 | 1.8 | 0.22/0.23 | 1.5 |
| E2 | 16 | 3 | 81 | 2,800/4,950 | 205/320 | 135 | 1.15 | 1.7 | 0.21/0.21 | 1.5 |
| E3 | 16 | 5 | 70 | 2,700/4,850 | 185/315 | 130 | 1.2 | 1.8 | 0.24/0.25 | 2.0 |
| E4 | 16 | 5 | 81 | 2,950/5,030 | 210/320 | 133 | 1.05 | 1.6 | 0.23/0.23 | 2.0 |
| CE1 | 16 | 3 | 54 | 2,200/4,800 | 140/300 | 110 | 1.45 | 2.1 | 0.25/0.26 | 1.8 |
| CE2 | 16 | 0 | 70 | | | | no film running | | | |
| CE3 | 16 | 0 | 54 | 2,200/4,200 | 130/300 | 100 | 1.75 | 2.2 | 0.26/0.27 | 1/5 |

TABLE 2-continued

| Film thickness μm | Resin content | Area stretching ratio | Modulus of elasticity DIN 53 457 longitudinal/-transverse N/mm² | Tensile strength DIN 53 455 longitudinal/-transverse N/mm² | Gloss DIN 67 530 (measuring angle 20°) | Water vapor transmission DIN 53 122 g/m² d | Opacity ASTM D 1003-52 % | Friction 14 days after production A side/D side | High-temperature blocking characteristics N |
|---|---|---|---|---|---|---|---|---|---|

E = Example
CE = Comparative Example

What is claimed is:

1. A process for the production of a biaxially-oriented propylene polymer film, which comprises:

extruding through a flat die at least one melt comprising at least one propylene polymer having a n-heptane insoluble fraction with an isotacticity, measured by means of $^{13}$C-NMR spectroscopy, of 85 to 94%, wherein said melt contains 1 to 5% of a low molecular weight resin and is free of nucleating agents;

drawing off said melt on at least one draw-off roller to obtain a preliminary film;

orienting the preliminary film by stretching the film in the longitudinal direction in a ratio of from 6:1 to 9:1 and in the transverse direction in a ratio from 8:1 to 15:1 wherein the ratios are selected to provide a product of the longitudinal stretching ratio and the transverse stretching ratio which is≧60.

2. The process as claimed in claim 1, wherein the melt contains an antistatic agent, an anti-blocking agent, a lubricant, a stabilizer, a neutralizing agent, a pigment, regenerated film material, or a mixture thereof.

3. The process as claimed in claim 1, further comprising recovering a film wherein the product of the tensile strength in the longitudinal and transverse directions is greater than 50,000 (N/mm²)².

4. The process as claimed in claim 1, further comprising recovering a film wherein the product of the modulus of elasticity of the film in the longitudinal direction and the modulus of elasticity of the film in the transverse direction is greater than $9 \times 10^6$ (N/mm²)².

5. The process as claimed in claim 1, further comprising recovering a film wherein the tensile strength of the film in the longitudinal direction is greater than 170N/mm² and that in the transverse direction is greater than 290N/mm².

6. The process as claimed in claim 1, further comprising recovering a film which has a water vapor transmission that is≦24/thickness in μm(g/m²·d).

7. The process as claimed in claim 1, further comprising recovering a film which has a gloss of≧110% and the opacity is≦2.5.

8. The process as claimed in claim 1, wherein only one melt is extruded.

* * * * *